United States Patent [19]

Wakayama

[11] Patent Number: 5,259,241
[45] Date of Patent: Nov. 9, 1993

[54] DISPLAY UNIT FOR DISPLAYING THE OUTPUT OF A VEHICLE ENGINE

[75] Inventor: Atsuo Wakayama, Isesaki, Japan

[73] Assignee: Japan Electronic Control Systems Co., Ltd., Isesaki, Japan

[22] PCT Filed: May 22, 1991

[86] PCT No.: PCT/JP91/00682

§ 371 Date: Dec. 31, 1991

§ 102(e) Date: Dec. 31, 1991

[87] PCT Pub. No.: WO91/18270

PCT Pub. Date: Nov. 28, 1991

[30] Foreign Application Priority Data

May 22, 1990 [JP] Japan .................................. 2-130295

[51] Int. Cl.$^5$ ............................................. G01L 5/00
[52] U.S. Cl. .................... 73/117.3; 364/431.03
[58] Field of Search ............ 73/117.3, 117.2, 118.2, 73/116; 364/431.03

[56] References Cited

U.S. PATENT DOCUMENTS 3,847,019 11/1974 Masaki et al. ...................... 73/117.3

FOREIGN PATENT DOCUMENTS

| | | |
|---|---|---|
| 0340764 | 11/1989 | European Pat. Off. . |
| 3246798A1 | 6/1984 | Fed. Rep. of Germany . |
| 57-192835 | 11/1982 | Japan . |
| 58-177728 | 1/1984 | Japan . |
| 1-124536 | 8/1989 | Japan . |
| 2-144741 | 7/1990 | Japan . |
| 3-42041 | 4/1991 | Japan . |

*Primary Examiner*—Hezron E. Williams
*Assistant Examiner*—Michael Brock
*Attorney, Agent, or Firm*—Foley & Lardner

[57] ABSTRACT

A display unit for displaying the output of a vehicle engine measures and displays the output or torque of the engine during a normal running state.

The unit calculates and displays the output of the engine according to an intake air quantity and engine rotational speed. The unit calculates an output for a predetermined steady run corresponding to a present vehicle speed. If the engine output calculated according to the intake air quantity and rotational speed is smaller than the steady-run output, the unit displays zeros.

6 Claims, 2 Drawing Sheets

DISPLAY UNIT FOR DISPLAYING THE OUTPUT OF A VEHICLE ENGINE

TECHNICAL FIELD

The present invention relates to a display unit for measuring and displaying the output or torque of a vehicle engine while the engine is normally operating.

BACKGROUND OF THE INVENTION

Information such as the rotational speed and cooling water temperature of a vehicle engine are displayed on indicators in front of a driver's seat. Torque produced by the engine is not usually displayed or used as data for various control mechanisms such as an automatic transmission. The reason for this is because it is not easy to detect the torque when the vehicle is running.

To correctly detect the torque of the vehicle engine, a bench test using a chassis dynamometer must be carried out. A torque sensor may also be used to precisely detect minimal torsion of shafts interposed in a power transmission system. This torque sensor is expensive.

This applicant has proposed (Japanese Utility Model Application No. 1-102348) an output display unit for calculating and displaying the output or torque of an engine, which is normally operating, according to the intake air quantity and rotational speed of the engine, which si substantially inevitable information required for controlling the fuel supplied to the engine, without using an expensive large scale apparatus.

This output display unit, however, provides a display of figures during deceleration in which the output and basic torque of the engine is actually zero. This happens in some vehicles which lowers the commercial value of the display unit.

This occurs because a small amount of air is supplied to the engine through an anti-afterburning valve (hereinafter referred to as the AB valve), which prevents secondary air and exhaust heat after sudden deceleration from causing afterburning that may cause a temperature increase and explosion in an exhaust system, and a boost control valve (hereinafter referred to as the BC valve), which presents the generation of a large quantity of unburnt gases after sudden deceleration.

Functions of the AB and BC valves will be explained in detail. When a fuel in an intake manifold flows along a wall into a combustion chamber of the engine just before deceleration with a throttle valve completely closed an air-fuel ratio becomes excessively dense, and unburnt fuel is discharged as flows to the exhaust system. This unburnt fuel causes afterburning due to secondary air and exhaust heat, thereby adversely influencing the exhaust system. To prevent this, the AB valve introduces air into the intake manifold at deceleration (a deceleration air-fuel ration correction function). During deceleration with the throttle valve completely closed, a negative pressure in the intake manifold increases to cause a high boost phenomenon. This causes an insufficient compressing pressure, incomplete combustion, increase of unburnt gas (GC) and rise of oil. To prevent this, the BC valve introduces air into the intake manifold to maintain a predetermined negative pressure in the intake manifold during the deceleration (a deceleration negative pressure correction function).

A main object of the invention is to provide an output display unit for a vehicle engine, which displays zeros when AB and BC valves of the engine are active just after deceleration, thereby improving the commercial value of the display unit.

Another object of the invention is to achieve the above main object with use of parameters that can be detected by existing sensors, and correctly display the output and torque of the engine.

SUMMARY OF THE INVENTION

An output display unit for a vehicle engine according to the invention comprises the following means (a) to (f):

(a) a first means for detecting an intake air quantity to the engine;

(b) a second means for detecting an engine rotational speed;

(c) a third means for detecting a vehicle speed;

(d) a fourth means for calculating an engine output for a predetermined steady run corresponding to the vehicle speed detected by the third means;

(e) a fifth means for calculating an engine output according to the intake air quantity detected by the first means and the rotational speed detected by the second means; and (f) a sixth means for displaying zeros as the engine output when the output calculated by the fifth means is smaller than the output calculated by the fourth means, and displaying the output calculated by the fifth means as it is in the other cases.

In this way, the invention calculates an engine output for a predetermined steady run corresponding to a detected vehicle speed. If an engine output calculated according to the intake air quantity and rotational speed of the engine is smaller than the engine output for the steady run, the invention determines that the output has been caused by activation of the AB and BC valves. In this case, the invention displays zeros because the engine provided no output, thereby correctly displaying the engine output.

The fifth means may calculate the engine output by calculating engine torque according to the intake air quantity and rotational speed of the engine, and and by calculating the engine output according to the torque and rotational speed.

More precisely, torque T of the engine is calculated from an intake air quantity Q and a rotational speed N according to the following equation:

$$T = K1 \times (Q/N)K2$$

(where K1 and K2 are constants determined according to the specifications of the engine. For example, K1 is about 280 to 350 and K2 is about 1 to 4. The constant K2 relates to torque for the rotation of the engine itself and is mainly determined according to the size of the displacement.)

An engine output P is calculated from the torque T and rotational speed N according to the following equation:

$$P = K3 \times N \times T$$

(where K3 is a constant derived from $K3 = 2\pi/(60 \times 75)$ as is well known).

The sixth means is preferred to have a torque display function displaying zeros as torque when the torque calculated by the fifth means is smaller than that calculated by the fourth means, and displays the torque calculated by the fifth means as it in the other cases.

The fourth means may have a table that stores predetermined engine outputs corresponding to various steady runs with respect to different engine speeds. One of the stored engine outputs for the steady runs is retrieved out of the table according to a detected vehicle speed.

BEST MODE FOR CARRYING OUT THE INVENTION

An embodiment of the invention will be explained in detail with reference to the drawings.

Figure 1:
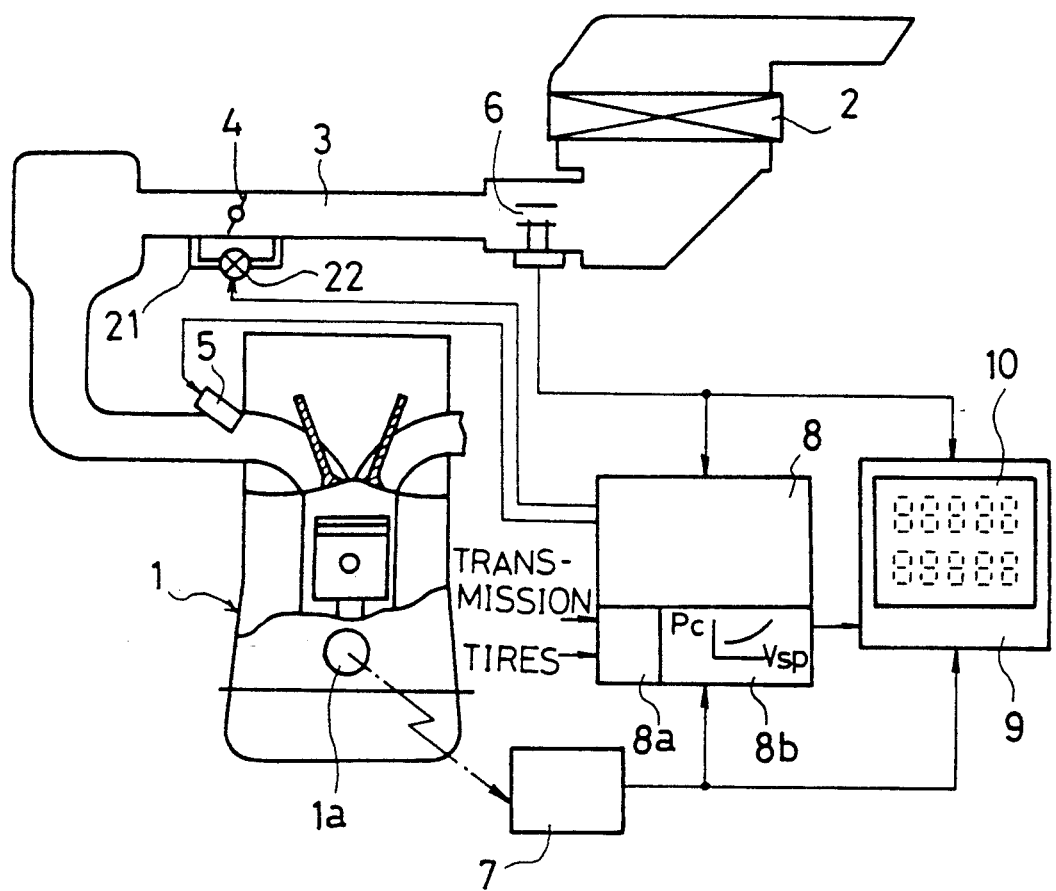
FIG. 1 is a view showing an output display unit for a vehicle engine according to an embodiment of the invention.

Referring to FIG. 1, an engine 1 is connected to an air cleaner 2 through an intake path 3 in which a throttle valve is disposed. On the downstream side of the throttle valve 4, there is a solenoid fuel injection valve 5 arranged for each cylinder to supply a fuel to an intake port of the cylinder. An auxiliary air path 21 bypassing the throttle valve 4 has a solenoid auxiliary air control valve 22 which provides functions of the AB and BC valves.

A hot-wire airflow meter 6 (a first means) for detecting an intake air quantity Q to the engine 1 is arranged, for example, on the upstream side of the throttle valve 4 in the intake path 3.

A crank angle sensor 7 (a second means) for generating a pulse signal for every predetermined angle of rotation of a crank shaft 1a is arranged, for example, at an end of the crank shaft 1a of the engine 1. According to the pulse signals, an engine rotational speed N (the number of revolutions per unit time, i.e., RPM) is detected.

Signals from the airflow meter 6 and crank angle sensor 7 are transferred to an engine control unit 8 and a measuring unit 9.

The engine control unit 8 incorporates a controller for forming, together with the fuel injection valve 5 and auxiliary air control valve 22, a fuel control system and an auxiliary air control system. The engine control unit 8 also includes a vehicle speed sensor 8a (a third means) for detecting a vehicle speed Vsp according to information related to a transmission and tires, and a steady-run output calculation means 8b (a fourth means) for calculating an engine output for a predetermined steady run (hereinafter referred to as the steady-run output) with respect to the detected vehicle speed Vsp.

The engine control unit 8 comprises a microcomputer system for controlling operations of the fuel injection valve 5 and auxiliary air control valve 22 according to predetermined programs. A function of the steady-run output calculation means 8b is also achieved by executing a predetermined program.

The measuring unit 9 calculates the torque (N m) and output (PS) of the engine 1 from time to time. The measuring unit 9 comprises a circuit portion and a casing that are integrally formed. On the front face of the casing, a display 10 for digitally displaying the result of the calculation is arranged. The measuring unit 9 with the display 10 is arranged on, for example, a dashboard in front of a driver's seat.

The measuring unit 9 comprises a microcomputer system (a fifth means), which receives signals from the airflow meter 6 and crank angle sensor 7 and calculates an engine output P according to the signals. The display 10 (a sixth means) compares the output of the measuring unit 9 with the output of the steady-run output calculates means 8b, and displays 0s when the output of the measuring unit 9 is smaller than the output of the steady-run output calculation means 8b, and displays the calculated output of the measuring unit 9 as it is in the other cases.

Figure 2:
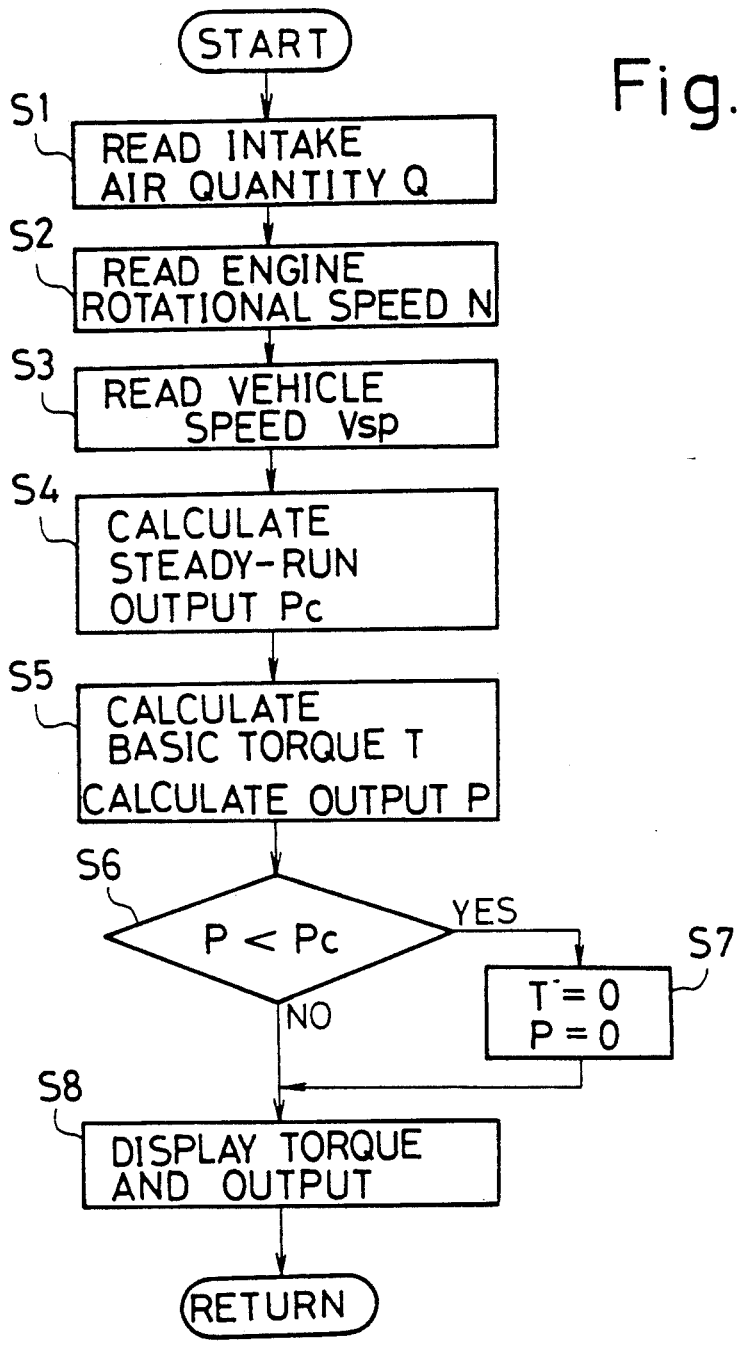
FIG. 2 is a flowchart showing a sequence of processes of the embodiment.

FIG. 2 is a flowchart schematically showing a program repeatedly executed in the engine control unit 8 (the steady-run output calculation means 8b) and measuring unit 9.

Step 1 (indicates as S1 in the figure) reads an intake air quantity Q obtained according to a detected signal from the airflow meter 6, and Step 2 reads an engine rotational speed N obtained according to a detected signal from the crank angle sensor 7.

Step 3 reads a vehicle speed Vsp obtained according to a detected signal from the vehicle speed sensor 8a.

Figure 3:
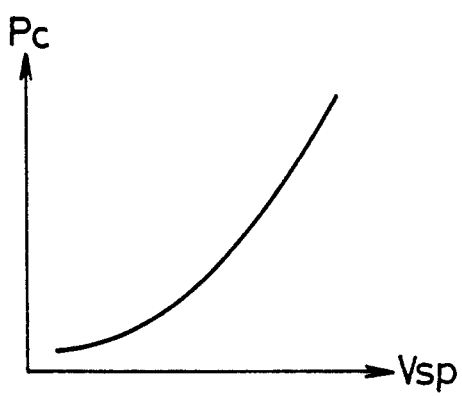
FIG. 3 is the diagram showing correlation between a vehicle speed and an output for a steady run.

Step 4 looks up a table, which has been prepared and stored according to a correlational graph (FIG. 3) of experimentally obtained vehicle speeds Vsp and steady-run outputs Pc, and retrieves out of the table a steady-run output Pc corresponding to the vehicle speed Vsp read in Step 3.

Step 5 calculates a basic torque T of the engine according to the intake air quantity Q and rotational speed N, with use of the following equation:

$$T = K1 \times (Q/N) + K2$$

where K1 and K2 are constants determined according to the specifications of the engine. For example, K1 is about 280 to 350 and K2 about 1 to 4. The constant K2 relates to torque for the rotation of the engine itself and is mainly determined according to the size of displacement.

Step 5 also calculates an engine output P (PS) according to the calculated torque T (N m) and engine rotational speed N (RPM) at this moment with use of the following equation:

$$P = [(2\pi N)/(60 \times 75)] \times T$$

Step 6 compares the engine output P with the steady-run output Pc.

If P<Pc (YES) as a result of the comparison, it is determined that there is an airflow due to the activation of the AB or BC valve for dealing with an exhaust gas, and that there is no engine output. Accordingly, Step 7 zeros the torque T and output P, and Step 8 displays 0s as torque and output indications on the display 10 disposed on the front face of the measuring unit 9.

In the other cases, i.e., if the output P is equal to or larger than Pc, it is determined to be in a steady or acceleration state, and Step 8 displays the torque T and output P calculated in Step 5 on the display 10 disposed on the front face of the measuring unit 9.

In this way, the embodiment provides correct indications. Accordingly, a driver may always known the torque T and output P of the engine during driving and is convenient for determining speed changing timing, etc.

The torque T, etc., thus obtained may be used not only for display purposes but also as input data for traction control.

The embodiment of the invention has been explained in detail with reference to the drawings. The invention is not limited to this embodiment. Modifications etc., within the space of the invention are also included in the invention.

As explained above, the invention displays 0s even if there is a flow of air due to operation of the AB or BC valve when there is no output of the engine during acceleration. In this way, the invention correctly and easily displays an engine output at a low cost with the use of existing sensors, thereby improving the commercial value of the display unit.

A display unit for displaying the output of a vehicle engine according to the invention correctly and simply displays the output at a low cost. The invention improves the commercial value of the display unit and is very useful in industry.

I claim:

1. A display unit for displaying the output of a vehicle engine comprising a first means for detecting an intake air quality to the engine, a second means for detecting an engine rotational speed, a third means for detecting a vehicle speed, a fourth means for calculating an engine output for a predetermined steady run corresponding to the vehicle speed detected by the third means, a fifth means for calculating an engine output according to the intake air quantity detected by the first means and the rotational speed detected by the second means, and a sixth means for displaying zeros as the engine output when the output calculated by the fifth means is smaller than the output calculated by the fourth means, and displaying the output calculated by the fifth means as it is in the other cases.

2. A display unit for displaying the output of a vehicle engine according to claim 1, wherein the fifth means calculates torque T of the engine according to the intake air quantity Q and rotational speed, and according to the torque and rotational speed, the output of the engine.

3. A display unit for displaying the output of a vehicle engine according to claim 2, wherein the fifth means calculates torque T of the engine according to the intake air quantity Q and rotational speed N, with the use of the following equation:

$$T = K1 \times (Q/N) + K2)$$

where K1 and K2 are constants.)

4. A display unit for displaying the output of a vehicle engine according to claim 2, wherein the fifth means calculates the output P of the engine according to torque T and the rotational speed N, with the use of the following equation:

$$P = K3 \times N \times T$$

(where K3 is a constant.)

5. A display unit for displaying the output of a vehicle engine according to claim 2, wherein the sixth means has a torque display function for displaying zeros as torque when the output calculated by the fifth means is smaller than the output calculated by the fourth means, and the torque calculated by the fifth means as it is in the other cases.

6. A display unit for displaying the output of a vehicle engine according to claim 1, wherein the fourth means has a table for storing predetermined engine outputs corresponding to various steady runs with respect to different vehicle speeds, and for retrieving one of the stored engine outputs for the steady runs out of the table according to the detected vehicle speed.

* * * * *